(12) United States Patent
Suzuki

(10) Patent No.: US 8,531,656 B2
(45) Date of Patent: Sep. 10, 2013

(54) METHOD AND APPARATUS FOR MEASURING EXIT ANGLE OF OPTICAL FIBER

(75) Inventor: Taro Suzuki, Kanagawa (JP)

(73) Assignee: Toyo Seikan Group Holdings, Ltd., Tokyo (JP)

( * ) Notice: Subject to any disclaimer, the term of this patent is extended or adjusted under 35 U.S.C. 154(b) by 104 days.

(21) Appl. No.: 13/265,562

(22) PCT Filed: Apr. 22, 2009

(86) PCT No.: PCT/JP2009/057987
§ 371 (c)(1),
(2), (4) Date: Oct. 21, 2011

(87) PCT Pub. No.: WO2010/122641
PCT Pub. Date: Oct. 28, 2010

(65) Prior Publication Data
US 2012/0044483 A1    Feb. 23, 2012

(51) Int. Cl.
*G01N 21/00* (2006.01)
(52) U.S. Cl.
USPC .......................................... 356/73.1
(58) Field of Classification Search
USPC .......................................... 356/73.1
See application file for complete search history.

(56) References Cited

U.S. PATENT DOCUMENTS

| | | | |
|---|---|---|---|
| 4,802,726 A * | 2/1989 | Palmquist et al. | 385/85 |
| 5,436,994 A * | 7/1995 | Ott et al. | 385/86 |
| 2008/0267562 A1* | 10/2008 | Wang et al. | 385/31 |

FOREIGN PATENT DOCUMENTS

| | | |
|---|---|---|
| JP | 6-148029 | 5/1994 |
| JP | 2003-21752 | 1/2003 |
| JP | 2005-233875 | 9/2005 |
| JP | 2005-292540 | 10/2005 |

OTHER PUBLICATIONS

International Search Report issued May 26, 2009 in International (PCT) Application No. PCT/JP2009/057987.
Japanese Office Action issued Oct. 5, 2011 in corresponding Japanese Patent Application No. 2009-526979, together with English translation thereof.
Korean Office Action issued Dec. 7, 2012 in Korean Patent Application No. 10-2011-7024144, together with English translation thereof.

* cited by examiner

*Primary Examiner* — Tarifur Chowdhury
*Assistant Examiner* — Omar Nixon
(74) *Attorney, Agent, or Firm* — Wenderoth, Lind & Ponack, L.L.P.

(57) ABSTRACT

A measurement end of an optical fiber is passed through a through hole of a holder. While the optical fiber is being rotated by using the through hole as a guide, output light from the measurement end is received by light receiving means. Coordinates of at least three points on a locus circle of the output light are measured to calculate a size of the locus circle. On the basis of the calculated size, the exit angle of the optical fiber is measured. The through hole of the holder has a small-diameter portion on a front side and a large-diameter portion on a rear side. An inside diameter of the small-diameter portion is 0.1 μm to 1.0 μm larger than a diameter of a bare fiber, and an inside diameter of the large-diameter portion is larger than a diameter of a sheathed fiber.

8 Claims, 17 Drawing Sheets

Fig. 10
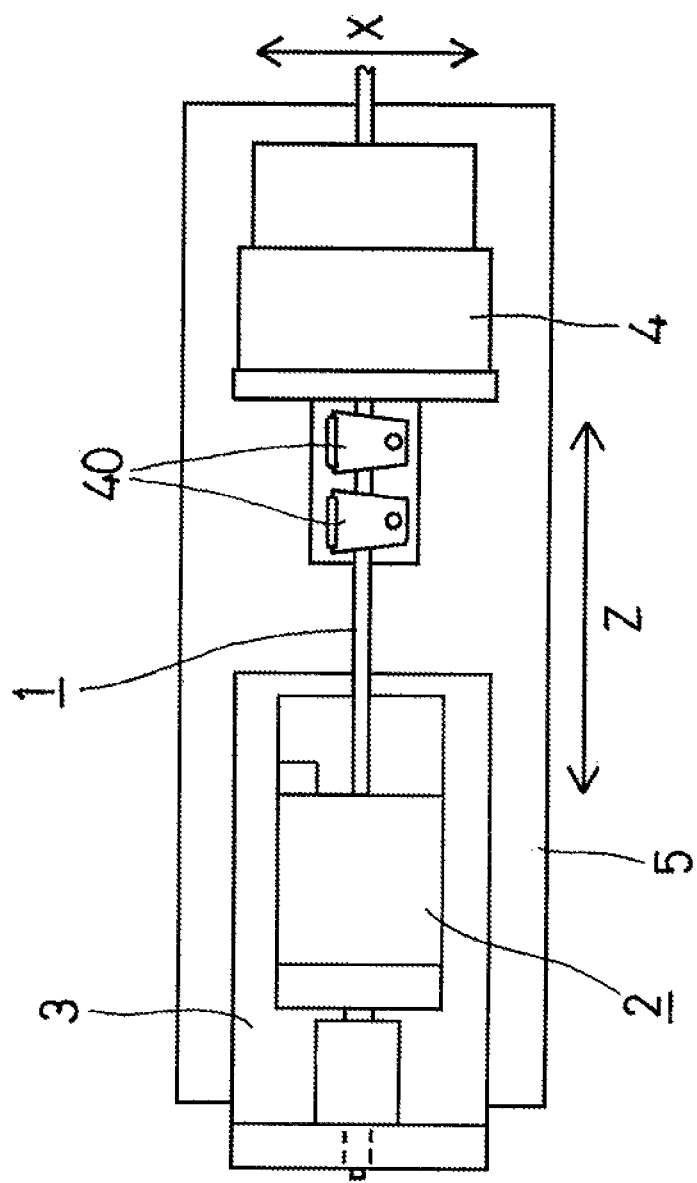
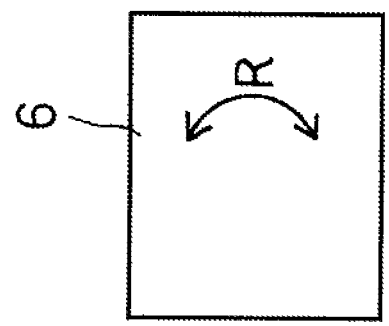

METHOD AND APPARATUS FOR MEASURING EXIT ANGLE OF OPTICAL FIBER

TECHNICAL FIELD

The present invention relates to a method and apparatus for measuring an exit angle of light emitted from an end face of an optical fiber used in optical communications.

BACKGROUND ART

As illustrated in FIG. 1, an optical fiber 1 having an inclined end face 1a not perpendicular to an optical axis S is known. Output light B from the inclined end face 1a is emitted at an exit angle θ with respect to the optical axis S.

As illustrated in FIG. 2, for example, if optical fibers 1 are coupled to each other by an optical switch, since light reflected at an inclined end face is not returned, an optical fiber having such an inclined end face is advantageous in that the optical signal is less likely to be affected by noise. In this case, an alignment operation is performed to minimize coupling losses of light. The alignment operation involves moving an optical fiber in an optical axis direction x and rotating the optical fiber in an r direction about the optical axis. To facilitate the alignment operation, it is required to reduce variations in the exit angle of the optical fiber (to ±0.15° or less).

Therefore, it is necessary to perform an inspection to see if an exit angle of a manufactured optical fiber is within a predetermined range.

A method and apparatus for inspecting an exit angle of an optical fiber are disclosed, for example, in Patent Literature (PTL) 1.

In this method and apparatus, a measurement end of an optical fiber is passed through a hole formed in a holder, having an inside diameter (Dw) at least 10 μm larger than an outside diameter (Df) of the optical fiber, and having a length of at least (Dw-Df)/tan(0.1°) in the axial direction. The optical fiber is rotated using the hole as a guide hole. Then, the size of at least part of a circle or ellipse drawn on a screen by output laser light from the measurement end face is measured. Thus, an exit angle (θ4) of the output laser light from the measurement end face is measured.

PTL 1 describes the fact that unless the inside diameter of the hole is at least 10 μm larger than the outside diameter of the optical fiber, the optical fiber is not properly inserted into the hole of the holder and is bent (see paragraph [0034]).

PTL 1 also describes the fact that with this method and apparatus, the repeatability of measurements of the exit angle (θ4) is within 0.1° (see paragraph [0043]).

To reduce variations in the exit angle of a manufactured optical fiber to ±0.15° or less, an acceptance level (threshold value) used in the inspecting method of PTL 1 needs to be a predetermined angle ±0.05°. This is because the repeatability of this method is 0.1° or less. This acceptance level, which is the predetermined angle ±0.05°, is very difficult to achieve and the passing rate is very low. As a consequence, a substantial number of acceptable products are included in products which have been rejected in practice.

Therefore, it is not practical to use the exit angle measuring method and apparatus with which a measurement repeatability of within 0.1° is achieved.

As a solution to this, a holder 7 illustrated in FIG. 16 is provided.

In the holder 7, a bare portion 1c obtained by removing a sheath at an end of the optical fiber 1 is placed in a V-shaped groove 70a formed in an upper surface of a plate-like main body 70. A retaining plate 71 of the holder 7 is placed on the bare portion 1c and pressed with a predetermined force F to fix the optical fiber.

In this fixed state, output light is received by light receiving means, such as a microscope, to measure the coordinates of the light receiving position. Then, after the retaining plate 71 is removed to rotate the optical fiber by a predetermined angle, the optical fiber is fixed by the retaining plate again to measure the light receiving position of the output light. By repeating this process several times (about six times), the coordinates of several points on a locus circle of output light are determined. From the coordinates, the diameter of the locus circle is calculated to determine the exit angle.

However, due to adhesion of fine airborne dust particles to the groove 70a and the retaining plate 71, a slight distortion in circular cross section of the optical fiber, or various other causes, the locus of the output light does not draw an accurate circle or the level of variations in values obtained in repeated measurements of the same optical fiber (repeatability of measurements) is not satisfactory. Additionally, measured values tend to vary due to individual differences among persons who perform the measurements.

Citation List

Patent Literature

PTL 1: Japanese Unexamined Patent Application Publication No. 2005-233875

As described above, using the exit angle measuring method and apparatus disclosed in PTL 1 in current practice is not practical in terms of accuracy.

With the measuring apparatus using the holder illustrated in FIG. 16, the standard deviation in repeated measurements is about $1.1°\times10^{-2}$, which is insufficient in accuracy. Moreover, the measuring operation is very cumbersome in that it involves rotating the optical fiber while repeatedly fixing and releasing the optical fiber to and from the holder.

An object of the present invention is to improve repeatability, facilitate a measuring operation, and accurately measure exit angles of many optical fibers in a short time.

SUMMARY OF THE INVENTION

The present invention is a method for measuring an exit angle of an optical fiber. The method includes passing a measurement end of the optical fiber through a through hole of a holder; receiving output light from the measurement end at light receiving means while rotating the optical fiber using the through hole as a guide; measuring coordinates of at least three points on a locus circle of the output light to calculate a size of the locus circle; and measuring the exit angle of light from the measurement end of the optical fiber on the basis of the size of the locus circle. The through hole of the holder has a small-diameter portion on a front side and a large-diameter portion on a rear side, an inside diameter of the small-diameter portion is 0.1 μm to 1.0 μm larger than a diameter of a bare fiber, an inside diameter of the large-diameter portion is larger than a diameter of a sheathed fiber, and a portion between the small-diameter portion and the large-diameter portion is tapered. The sheathed fiber with a sheath at a leading end thereof removed is inserted from a rear end of the large-diameter portion, and a bare portion obtained by removing the sheath at the leading end of the sheathed fiber is passed into the small-diameter portion to perform measurement.

In the present invention, where the inside diameter of the small-diameter portion of the through hole serving as a guide for rotation of the optical fiber is only 0.1 μm to 1.0 μm larger than the diameter of the bare (non-sheathed) fiber, an axial displacement of the optical fiber during its rotation is very small and the exit angle can be measured with high accuracy.

When the optical fiber with a sheath at the leading end of the measurement end removed is inserted from the large-diameter portion of the through hole, the bare portion at the leading end is guided from the tapered portion between the large-diameter portion and the small-diameter portion into the small-diameter portion. Thus, the bare portion at the leading end can be smoothly passed into the small-diameter portion without being bent.

The sheathed portion not at the leading end of the optical fiber is inserted into the large-diameter portion of the through hole and supported. Since the sheathed portion, not the bare portion, is exposed from the rear end of the through hole, the optical fiber is unlikely to be bent while being rotated.

In the present invention, the bare fiber is a non-sheathed optical fiber, and the diameter of the bare fiber is a specified diameter of the non-sheathed optical fiber. Typically, a manufactured optical fiber has an error of within about 0.2 µm in diameter. Therefore, it is more preferable that the inside diameter of the small-diameter portion be 0.4 µm to 0.6 µm larger than the diameter of the bare fiber.

For insertion of the sheathed portion of the optical fiber (sheathed fiber), the large-diameter portion may be of any inside diameter larger than the outside diameter of the sheathed fiber. It is preferable, however, that the inside diameter of the large-diameter portion be 0.05 mm to 3 mm larger than the outside diameter (specified diameter) of the sheathed fiber.

The output light from the measurement end (end face) of the optical fiber can be directly received by the light receiving means, such as a CCD camera, so that the coordinates of the light receiving position can be easily and accurately measured by image processing means included in the light receiving means.

The diameter of the locus circle can be determined by measuring coordinates of output light at not less than three points while rotating the optical fiber. For better measurement accuracy, coordinates are to be measured at not less than four points or, more preferably, at not less than six points.

The exit angle $\theta$ can be determined by $$\theta = \tan^{-1}(D/2Z)$$

where D is a diameter of a locus circle, and Z is a distance from the light receiving surface of the light receiving means to the center of the end face of the optical fiber.

In the present invention, the holder can include fixing means that can selectively switch between a fixed state in which the optical fiber is fixed and a released state in which the fixed state is released.

Since the optical fiber can be freely fixed to and released from the holder, it is possible to facilitate the operation of setting rotating means and a light source while the optical fiber is being fixed to the holder. For rotation of the optical fiber during measurement, the fixed state of the optical fiber can be released.

For efficiency in operation, an optical fiber to be subsequently measured can be inserted into and fixed to the holder during measurement of the exit angle.

In the present invention, a diameter $D_1$ of the locus circle can be calculated at a position where a distance from the light receiving means to a center of a measurement end face of the optical fiber is $Z_1$, a diameter $D_2$ of the locus circle can be calculated at a position where the distance is $Z_2$, and an exit angle $\theta$ of the optical fiber can be determined by $$\theta = \tan^{-1}[\{D_2 - D_1\}/2\{Z_2 - Z_1\}]$$

As described above, the exit angle $\theta$ can be determined by $$\theta = \tan^{-1}(D/2Z)$$

where D is a diameter of a locus circle, and Z is a distance from the light receiving surface of the light receiving means to the center of the end face of the optical fiber. In general, however, it is difficult to accurately determine the distance Z from the light receiving surface of the light receiving means to the center of the end face of the optical fiber. Moreover, the distance Z changes every time the optical fiber is placed on the holder. Measuring the distance Z every time the optical fiber is placed is thus required, which is very cumbersome.

However, when the diameter of the locus circle is measured at two points $Z_1$ and $Z_2$, the value of $\{Z_2 - Z_1\}$ can be measured very accurately and easily. For example, after the holder is placed on a stage that can move in the optical axis direction of the optical fiber, the length of travel of the stage for measurements at the two points $Z_1$ and $Z_2$ is determined. Thus, without measuring the distance from the light receiving surface of the light receiving means to the center of the end face of the optical fiber, it is possible to accurately measure the value of $\{Z_2 - Z_1\}$.

Obviously, either of the measurements at the two points $Z_1$ and $Z_2$ can be performed first.

The present invention is an apparatus for measuring an exit angle of an optical fiber. The apparatus includes a holder having a through hole for passing a measurement end of an optical fiber therethrough; rotating means configured to rotate the optical fiber placed in the holder; a laser source configured to cause laser light to be incident on an incident end of the optical fiber; light receiving means configured to receive output light from the measurement end of the optical fiber; image processing means configured to output coordinates of the received light; and processing means configured to calculate a size of a locus circle of the output light on the basis of the coordinates output from the image processing means. The through hole of the holder has a small-diameter portion on a front side and a large-diameter portion on a rear side, an inside diameter of the small-diameter portion is 0.1 µm to 1.0 µm larger than a diameter of a bare fiber, an inside diameter of the large-diameter portion is larger than a diameter of a sheathed fiber, and a portion between the small-diameter portion and the large-diameter portion is tapered. The sheathed fiber with a sheath at a leading end thereof removed is inserted from a rear end of the large-diameter portion, and a bare portion obtained by removing the sheath at the leading end of the sheathed fiber is passed into the small-diameter portion. The apparatus receives the output light from the measurement end of the optical fiber at the light receiving means while rotating the optical fiber using the through hole as a guide, and measures the exit angle of the optical fiber on the basis of the size of the locus circle calculated by measuring coordinates of at least three points on the locus circle of the output light.

This apparatus is one for carrying out the method of the present invention.

The rotating means can be a known rotating holder that holds an optical fiber centrally along the rotation axis thereof and rotates the optical fiber with a servomotor.

The light receiving means can be a commercially available CCD camera.

The image processing means can be a controller included in a commercially available CCD camera.

The processing means can be a commercially available personal computer.

The processing means facilitates control of the rotating means and automatic measurement of the exit angle.

In the present invention, the holder can include fixing means that can selectively switch between a fixed state in which the optical fiber is fixed and a released state in which the fixed state is released.

This apparatus is one for carrying out the method of the present invention.

In the present invention, the processing means can calculate a diameter $D_1$ of the locus circle at a position where a distance from the light receiving means to a center of a measurement end face of the optical fiber is $Z_1$, can calculate a diameter $D_2$ of the locus circle at a position where the distance is $Z_2$, and can determine an exit angle θ of the optical fiber by $$\theta = \tan^{-1}[\{D_2-D_1\}/2\{Z_2-Z_1\}].$$

This apparatus is one for carrying out the method of the present invention.

ADVANTAGEOUS EFFECTS OF INVENTION

In the method and apparatus of the present invention, where the inside diameter of the small-diameter portion of the through hole serving as a guide for rotation of the optical fiber is only up to 1.0 μm larger than the diameter of the bare (non-sheathed) fiber, an axial displacement during rotation of the optical fiber is very small and the exit angle can be measured with high accuracy and repeatability. Also, the optical fiber is unlikely to be bent while being placed on the holder or while being rotated.

The "degree of deviation" caused by the above-described slight gap (the difference between the inside diameter of the small-diameter portion of the through hole and the diameter of the bare fiber) during rotation of the fiber is the same at the positions of distances $Z_1$ and $Z_2$. Therefore, the resulting errors in locus circles are basically cancelled out.

Unlike the measuring method of the related art illustrated in FIG. 16, there is no need to fix and release the optical fiber to and from the holder every time the optical fiber is to be rotated. This can facilitate measuring operations, substantially eliminate variations in measured values caused by individual differences among persons who perform the measurements, make it easier to realize automatic measurements, and significantly contribute to improved measurements of exit angles of all manufactured optical fibers.

BRIEF DESCRIPTION OF DRAWINGS

FIG. 10 is a schematic plan view of an exit angle measuring apparatus according to an embodiment.

DETAILED DESCRIPTION OF THE INVENTION

FIG. 3 to FIG. 15 relate to a measuring method and apparatus according to an embodiment.

Figure 1:
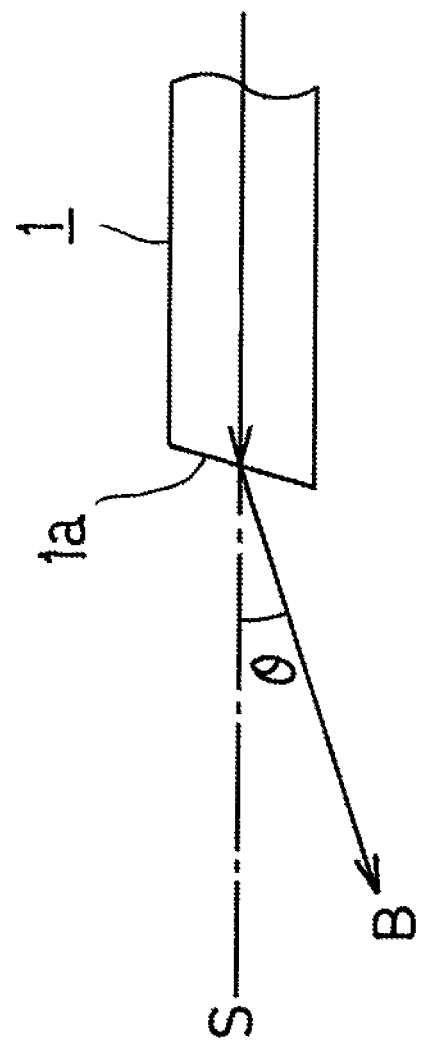
FIG. 1 illustrates an exit angle of an optical fiber having an inclined end face.
Figure 2:
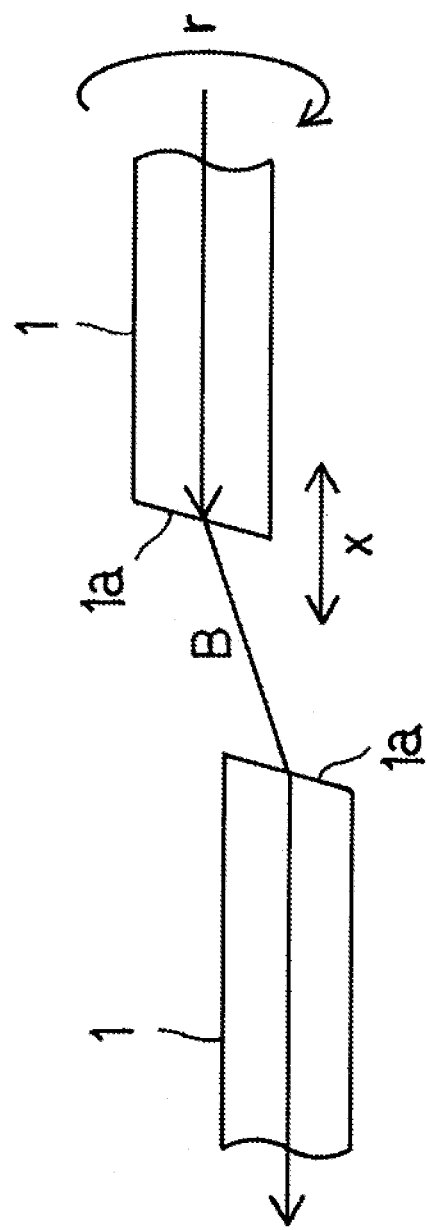
FIG. 2 illustrates an optical fiber switch for optical fibers each having an inclined end face.
Figure 3:
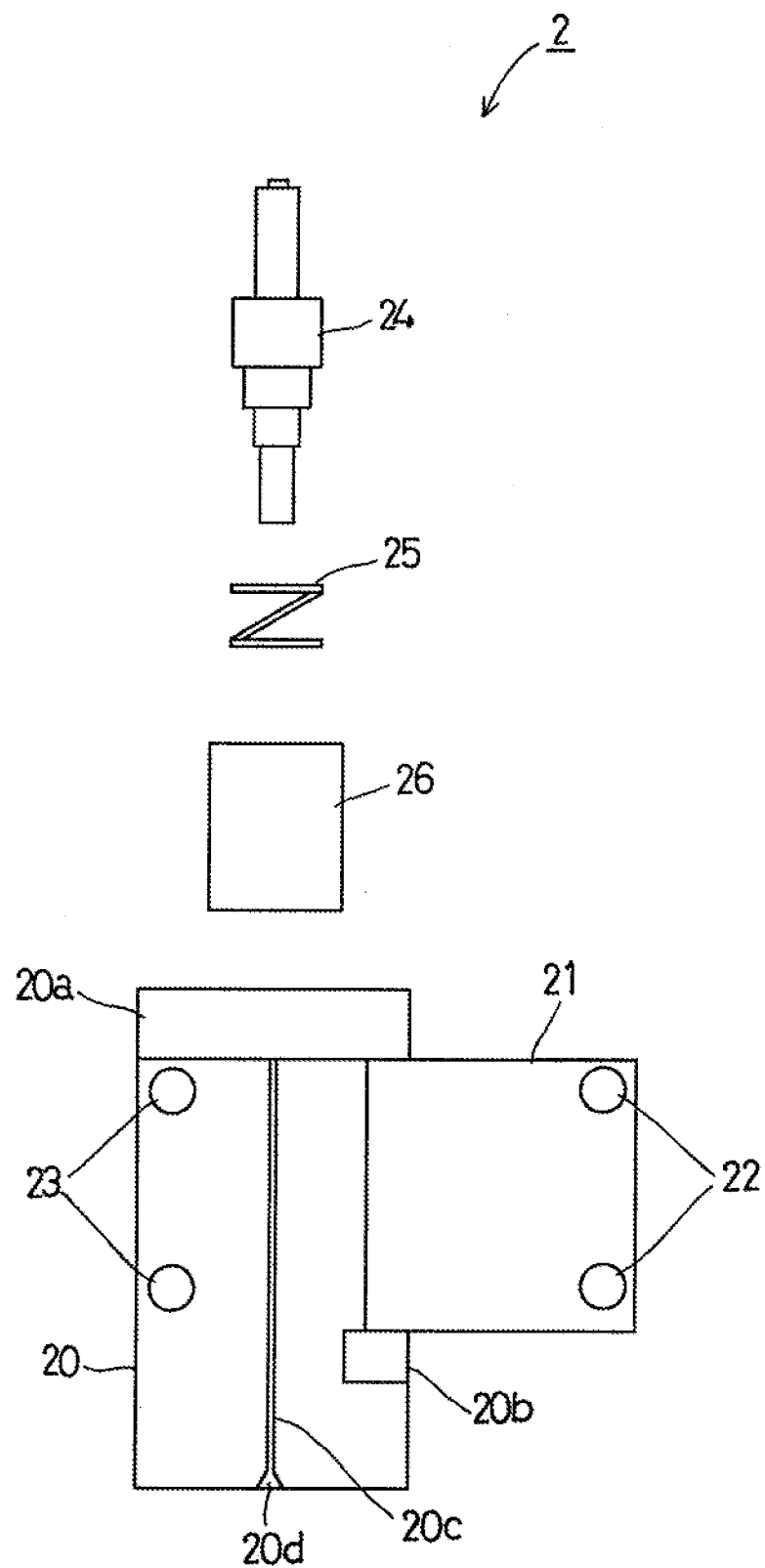
FIG. 3 is an exploded plan view of a holder.

A holder 2 includes a main body 20, a lid 21, an end tubular portion 24, a coil spring 25, and an outer ring 26 (see FIG. 3).

The main body 20 is a plastic plate-like member thicker at an end portion 20a. The end portion 20a is provided with a transverse hole 20e for insertion of an insertion portion 24f of the end tubular portion 24 (described below). An upper half of a rear end of the transverse hole is open in a back surface of the end portion 20a (see FIG. 5). An upper surface of the main body 20, except for the end portion 20a, is provided with a groove 20c for positioning a sheathed portion 1b of an optical fiber 1. The groove 20c is deep enough to accommodate the sheathed portion 1b of the optical fiber and shallow enough to expose an upper part of the sheathed portion 1b. A base end of the groove 20c is a groove widened portion 20d at which the groove is gradually widened.

The lid 21 made of plastic is pivotally attached to the main body 20 by being supported by a bearing 20b. Magnets 22 are embedded in the lid 21. When the lid is closed, the magnets 22 are attracted to screws 23 embedded in the upper surface of the main body 20. Thus, the upper part of the sheathed portion of the optical fiber positioned in the groove 20c is pressed to fix the optical fiber. When the lid is opened, the fixing of the optical fiber is released.

The end tubular portion 24 is a combination of three tubular metal components. The end tubular portion 24 is provided with a through hole extending centrally in the axial direction. The through hole has a small-diameter portion 24a on the front side and a large-diameter portion 24b on the rear side. An inside diameter of the small-diameter portion 24a is 125.5 μm, which is 0.5 μm larger than an outside diameter (125 μm) of a bare fiber. The small-diameter portion 24a is about 3.0 mm in length. An inside diameter of the large-diameter portion 24b is 1.0 mm, which is 0.1 mm larger than an outside diameter (0.9 mm) of the sheathed portion 1b of the optical fiber. The large-diameter portion 24b is about 7.5 mm in length.

There is a tapered portion 24c between the small-diameter portion 24a and the large-diameter portion 24b. The tapered portion 24c gradually becomes smaller in inside diameter toward the front end. This allows smooth insertion of a bare portion of the optical fiber from the large-diameter portion to the small-diameter portion. The large-diameter portion 24b is provided with a widened portion 24d having a tapered shape at the rear end. The widened portion 24d gradually becomes larger in inside diameter toward the rear end.

The end tubular portion 24 becomes smaller in diameter at a stepped portion 24g and extends, from the stepped portion 24g, as the insertion portion 24f at the rear end. The insertion portion 24f is inserted into the transverse hole 20e of the main body 20 and fixed (see FIG. 6). The widened portion 24d at the rear end of the through hole is open toward the inside and upper side of the groove 20c.

Figure 4:
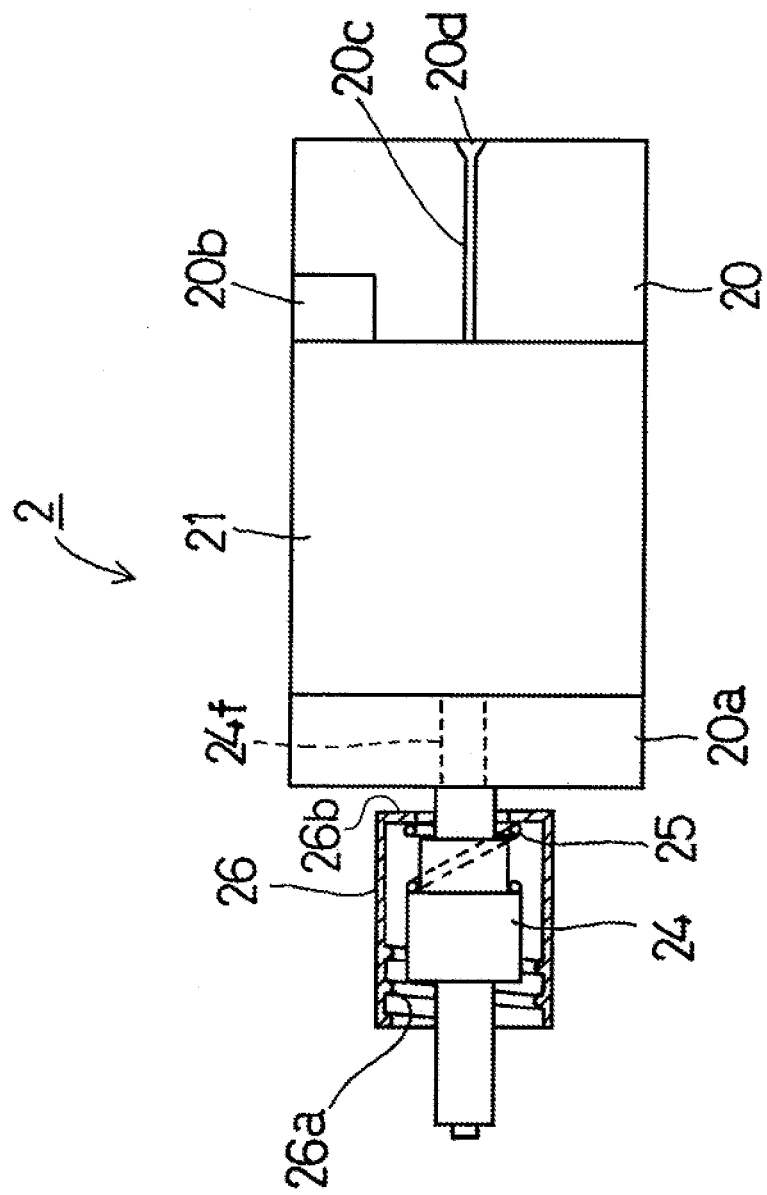
FIG. 4 is a partial cutaway plan view of the holder.
Figure 5:
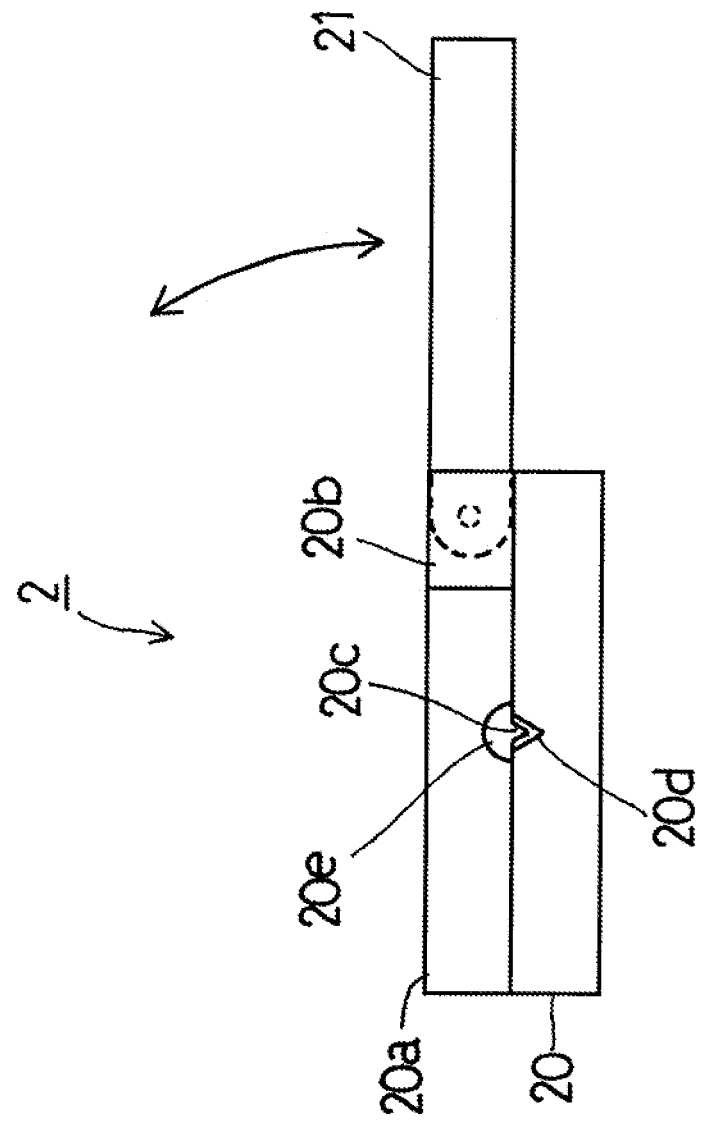
FIG. 5 is a back view of the holder with a lid open.
Figure 6:
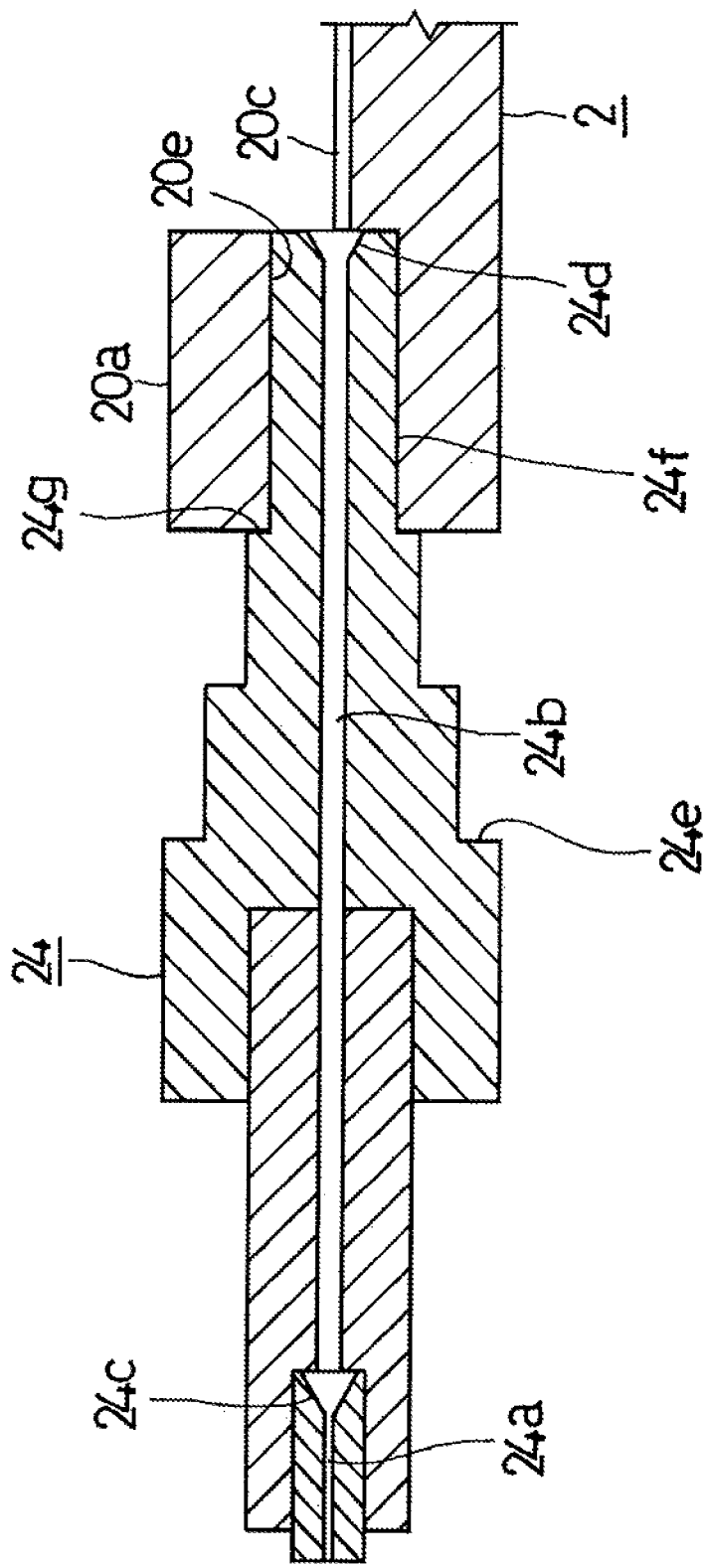
FIG. 6 is a cross-sectional view of the holder with an end tubular portion attached thereto.

Before insertion of the insertion portion 24f of the end tubular portion 24 into the transverse hole 20e of the main body 20, the coil spring 25 and the outer ring 26 are mounted on the periphery of the end tubular portion 24 (see FIG. 4).

The outer ring 26 is a metal tubular member internally provided with a female thread 26a on the front side. The female thread 26a is for fixing the outer ring 26 to a stand 3. The outer ring 26 has a reduced diameter portion 26b at the rear end.

The coil spring 25 is mounted between a stepped portion 24e of the end tubular portion 24 and the reduced diameter portion 26b of the outer ring 26. The coil spring 25 biases the end tubular portion 24 forward with respect to the outer ring 26. Thereby, the holder is firmly fixed to the stand (see FIG. 8).

The stand 3 is a metal member composed of a base plate portion 30 and a vertical plate portion 31 formed into an L-shape in side view. The vertical plate portion 31 has a hole 32 around which a metal mount 33 is fixed. The metal mount 33 has a tubular male-threaded portion with a flange therearound. The holder 2 is fixed to the stand 3 by screwing the female thread 26a of the outer ring 26 onto the male thread of the metal mount 33. Thus, the front extremity of the end tubular portion 24 is inserted into the hole 32 (see FIG. 8).

The optical fiber is passed through the rotation center of a rotating portion of a rotating holder 4 and fixed by chucks 40. The rotating portion is rotated by a servomotor. As the rotating portion rotates, the optical fiber rotates about its optical axis.

A stage 5 is a so-called bidirectional stage on which the stand 3 and the rotating holder 4 are placed and fixed. The stage 5 can move in the optical axis direction (Z-axis direction) and the direction (X-axis direction) perpendicular to the optical axis direction (see FIG. 10).

In the present embodiment, light receiving means is a CCD camera 6 placed and fixed on a rotatable stage (not shown). The CCD camera 6 includes a controller (not shown) which serves as image processing means.

While not shown, there are provided a laser source and processing means in the present embodiment.

The laser source is a laser oscillator that emits laser light having a wavelength of 1550 nm. The laser light from the laser source is incident on an incident end of the optical fiber to be measured.

The processing means is a personal computer connected to the controller serving as the image processing means. The processing means displays and records, in various modes, images received by the light receiving means and other image information from the image processing means. From coordinates of a position at which output light is received, the processing means calculates a diameter of a locus circle of the output light. Software that controls rotation of the rotating holder, automatically calculates a diameter of output light, and records the calculated diameter is installed in the processing means.

A procedure for measuring an exit angle of output light from the optical fiber will now be described.

First, a sheath at a measurement end of the optical fiber is removed about 3 mm to 4 mm to obtain a bare portion 1c at the leading end of the optical fiber. Next, the measurement end of the optical fiber is inserted through the groove 20c of the holder 2 into the large-diameter portion 24b of the end tubular portion. The bare portion 1c is inserted into the small-diameter portion 24a. Then, the lid 21 is closed to fix the optical fiber 1 to the holder 2 (see FIG. 9).

Figure 7:
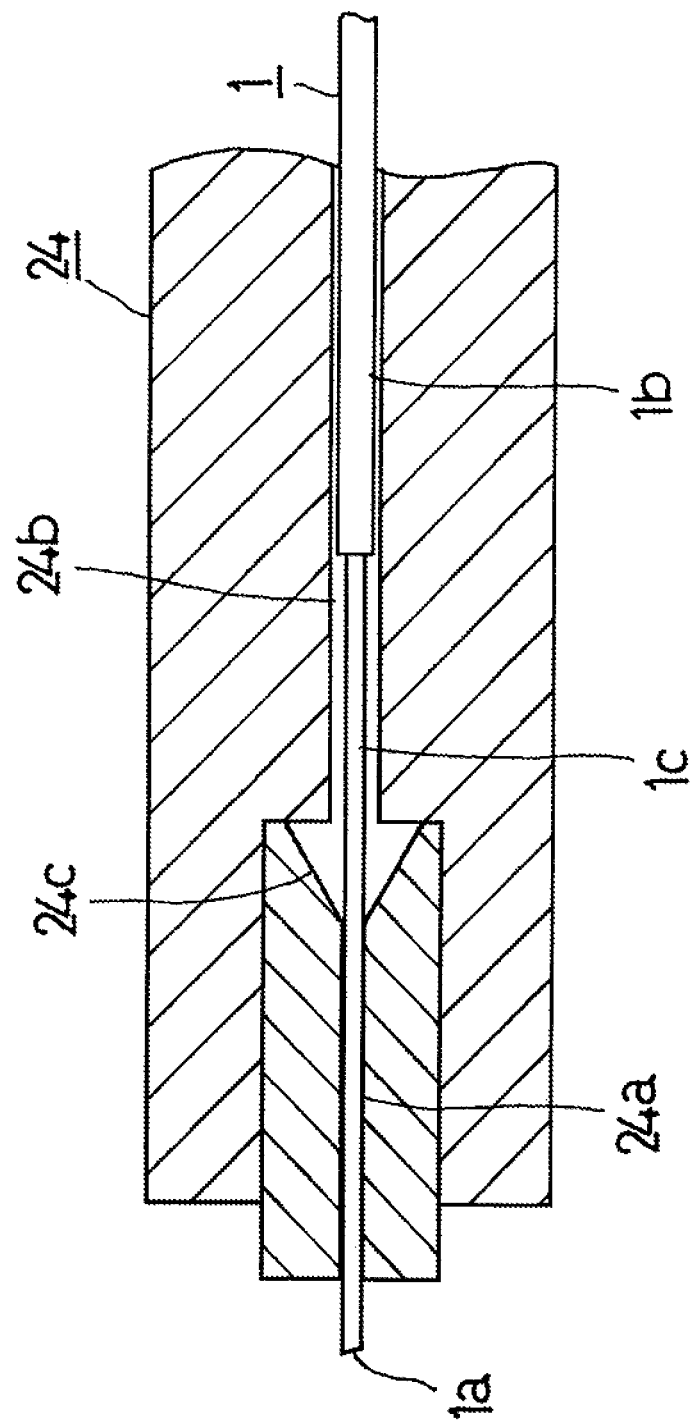
FIG. 7 is a partial cross-sectional view of the end tubular portion and the optical fiber inserted therein.
Figure 8:
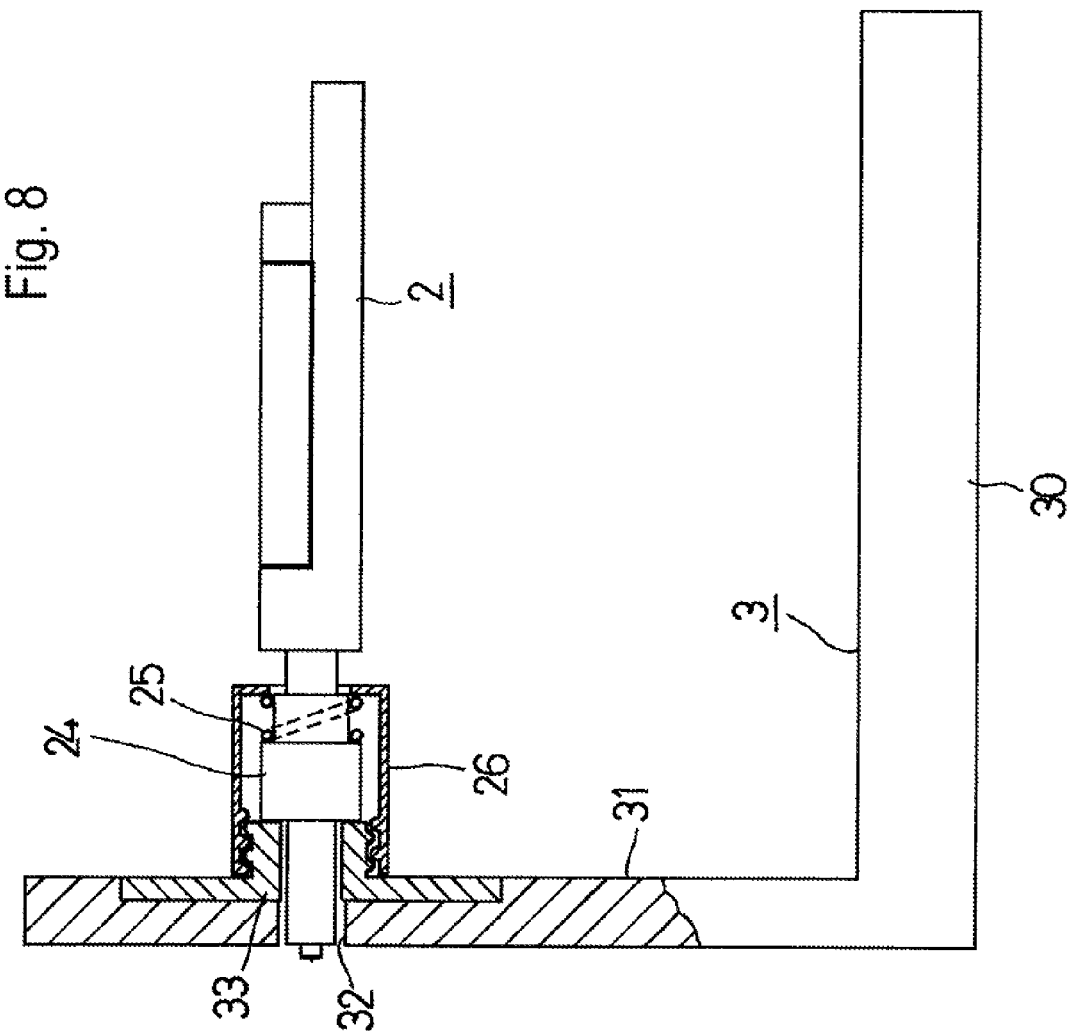
FIG. 8 is a partial cutaway side view of a stand and the holder fixed thereto.
Figure 9:
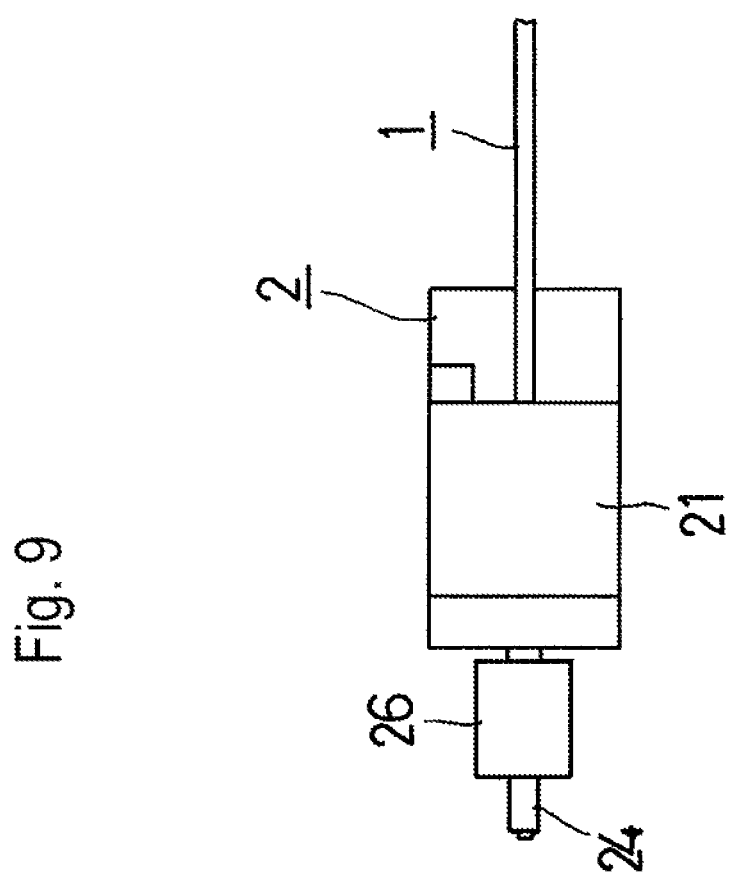
FIG. 9 is a plan view of the holder and the optical fiber inserted therein.
Figure 11:
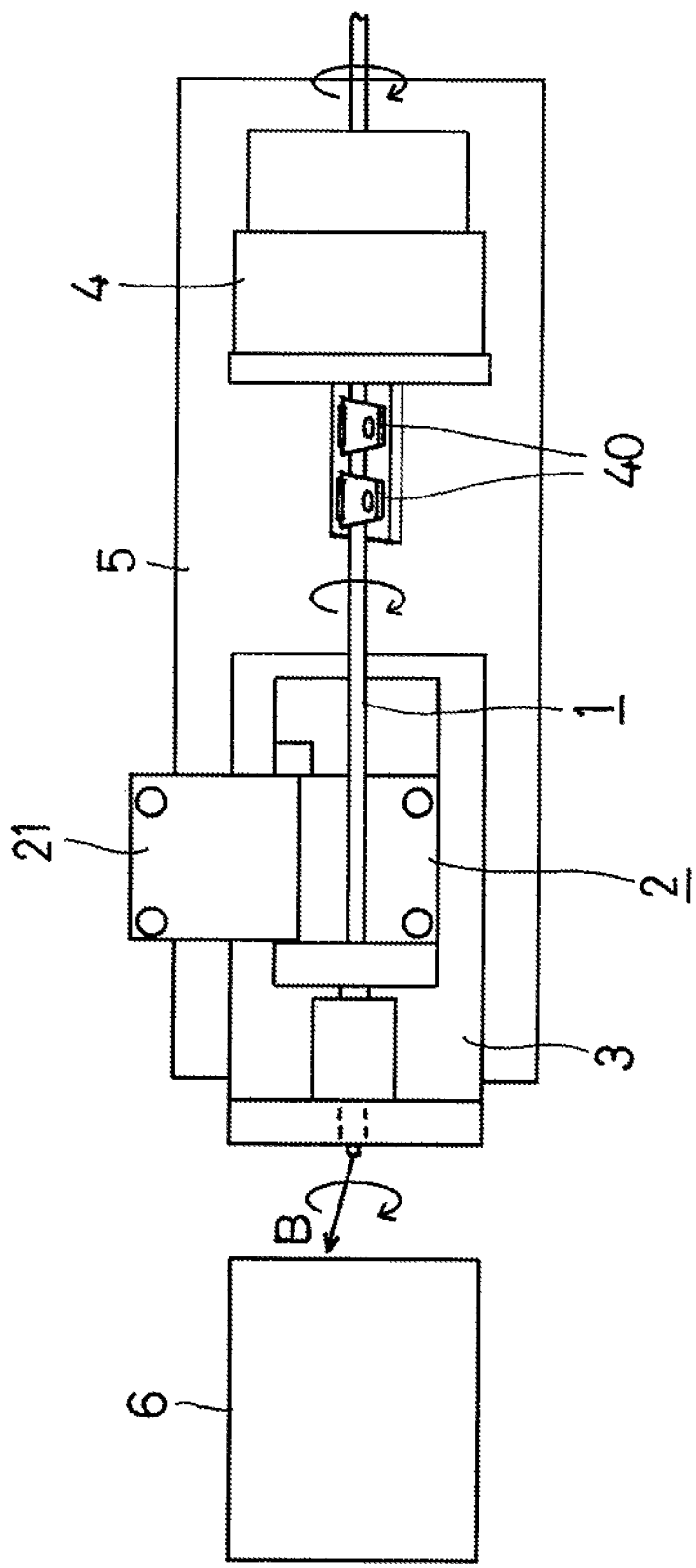
FIG. 11 is a schematic plan view of the exit angle measuring apparatus according to the embodiment.

It is preferable, at this point, that the leading end of the optical fiber protrude slightly (preferably about 0 mm to 0.5 mm) from the front extremity of the end tubular portion 24 (see FIG. 7).

Next, the holder 2 is fixed to the stand 3, the optical fiber 1 is placed on the rotating portion of the rotating holder 4, and the laser oscillator is attached to the incident end of the optical fiber.

To align the direction of a light receiving surface of the CCD camera 6 with the optical axis direction (Z direction) of the optical fiber, the angle of the CCD camera in an R direction is adjusted in advance. At the same time, the positioning of the stage 5 in the X-axis direction is performed in advance such that the locus circle of output light completely fits in the light receiving surface of the CCD camera 6 (see FIG. 10).

Figure 14:
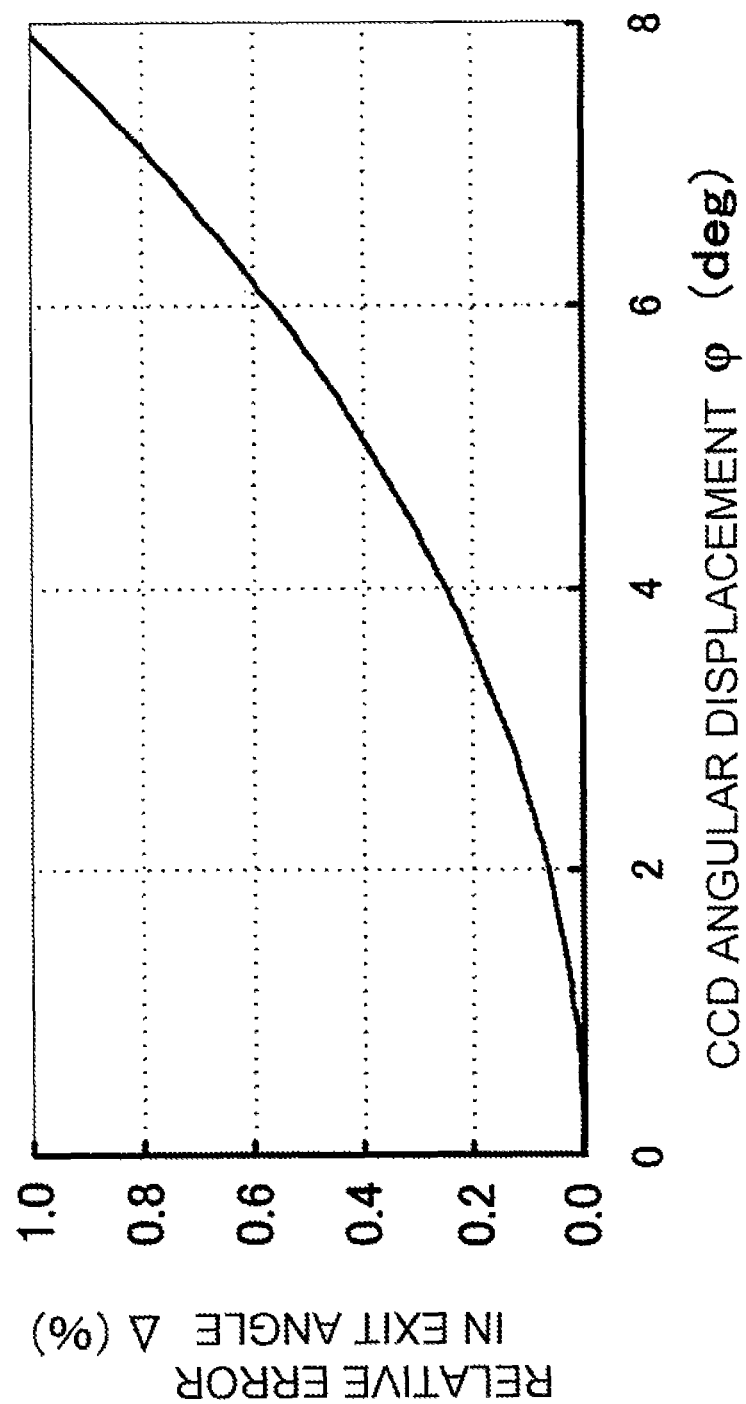
FIG. 14 illustrates a relationship between error and angular displacement of a light receiving surface of light receiving means.

FIG. 14 illustrates a relationship between an angular displacement) ($\phi°$) between the optical axis direction (Z direction) of the optical fiber and the direction of the light receiving surface of the CCD camera 6 and the resulting error in exit angle (relative error in exit angle $\Delta\%$). If $\phi$ is 2° or less, the error $\Delta$ is practically negligible.

Next, the lid 21 of the holder 2 is opened to release fixing of the optical fiber 1. Then, a start button of the processing means is pressed to start automatic measurement (see FIG. 11).

The optical fiber 1 is rotated about 360° by rotation of the rotating holder 4. During this, the controller serving as the image processing means transmits positional data of received output light to the processing means. From the coordinates of any six points on the locus circle of the output light, the processing means calculates a diameter of the locus circle. The time from when the start button is pressed to when the diameter of the locus circle is determined is about 4 seconds to 5 seconds.

Figure 13:
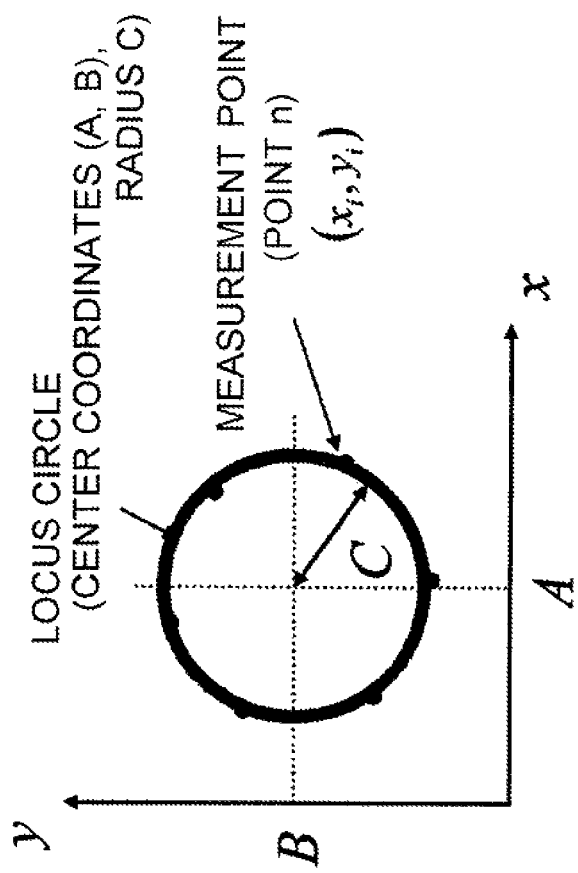
FIG. 13 illustrates a method for calculating a diameter D (radius C) of a locus circle of output light.

FIG. 13 illustrates an exemplary method (least-squares method) for calculating a diameter from coordinates of points (six points) on a locus circle of measured output light.

The output light received by the CCD camera is formed into a spot shape. The coordinates of the output light are at the center of the spot.

The calculation of the diameter of the locus circle described above is performed at any two points on the Z-axis.

Figure 12:
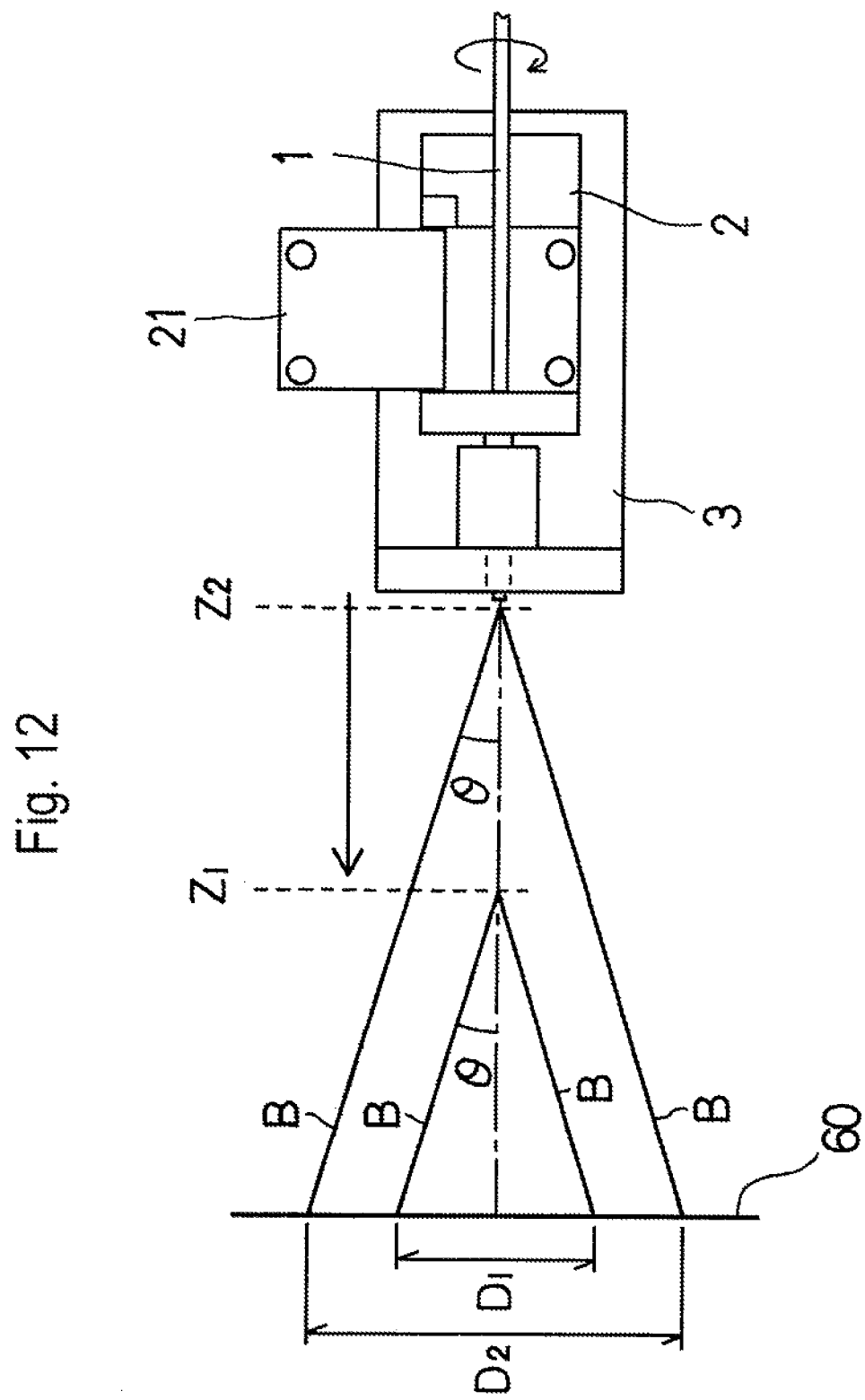
FIG. 12 illustrates an exit angle measuring method according to the embodiment.

FIG. 12 illustrates an example where the calculation described above is performed at positions $Z_1$ and $Z_2$ on the Z-axis.

For example, the positions $Z_1$ and $Z_2$ can be defined as $Z_1 \approx 5$ mm and $Z_2 \approx 13$ mm. The exit angle $\theta$ of the optical fiber can be expressed as follows:

$$\theta = \tan^{-1}[\{D_2 - D_1\}/2\{Z_2 - Z_1\}]$$

where $D_1$ is a diameter of a locus circle formed at the position where a distance to a center of a measurement end face of the optical fiber is $Z_1$, and $D_2$ is a diameter of a locus circle formed at the position where the distance described above is $Z_2$.

The processing means calculates the exit angle $\theta$ from the equation described above, displays the calculated exit angle $\theta$ on a display screen, and stores the calculated exit angle $\theta$ in memory.

A value of $\{Z_2 - Z_1\}$, which represents a travel distance of the stage 5 in the Z-axis direction, can be determined easily and accurately. It is thus possible to significantly reduce error in measured exit angle.

Figure 15:
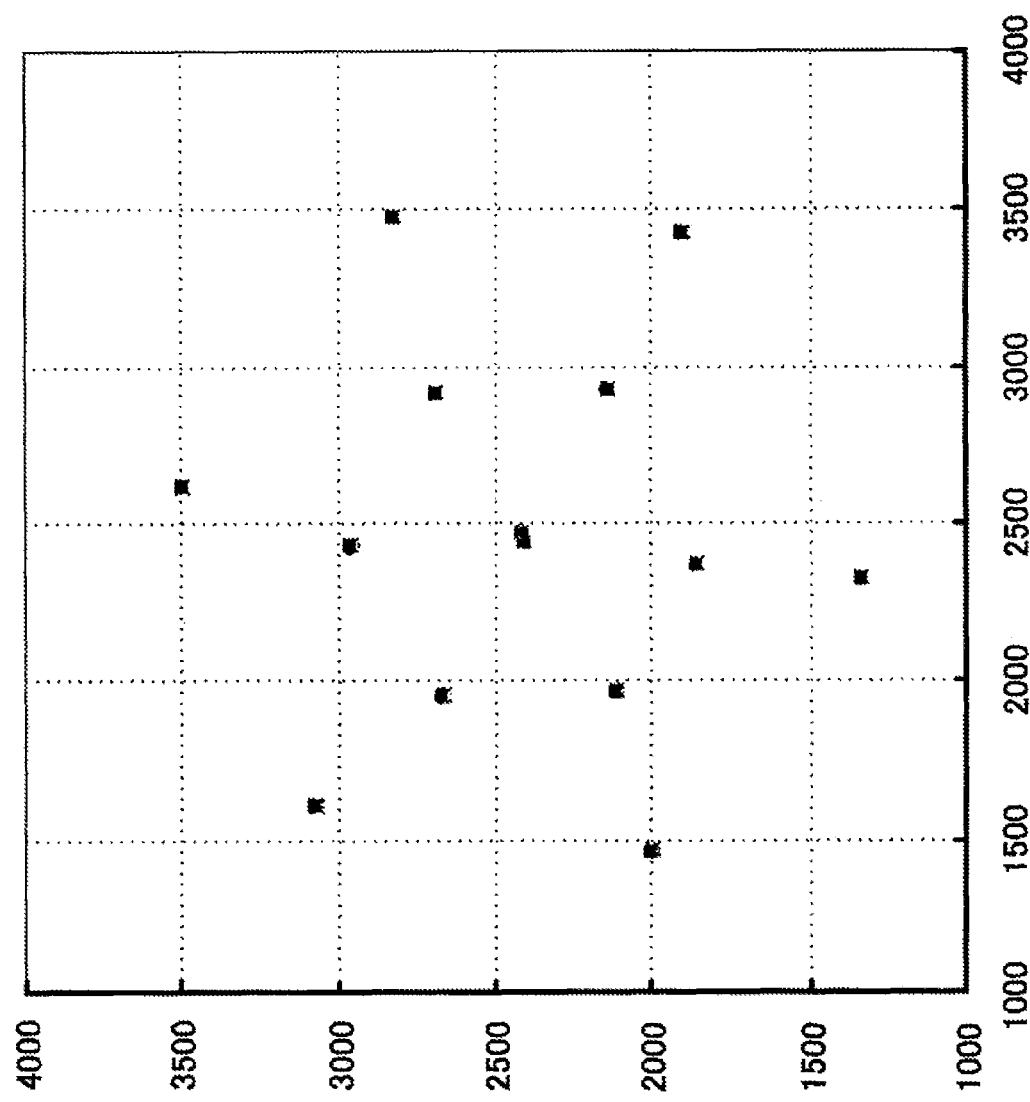
FIG. 15 illustrates results of measurements performed with a measuring method according to the embodiment.

FIG. 15 illustrates superimposed results of 11 repeated measurements performed on a single optical fiber by the measuring apparatus of the embodiment. Points at the center represent centers of locus circles, points at six inner positions represent results of measurements performed at $Z_1$, and points at six outer positions represent results of measurements performed at $Z_2$.

As illustrated in FIG. 15, the results of the 11 measurements almost exactly coincide with each other. In the present embodiment, the repeatability of measurements of the exit angle was ±0.013° or less, and the standard deviation was $3.28 \times 10^{-3}$.

Figure 16:
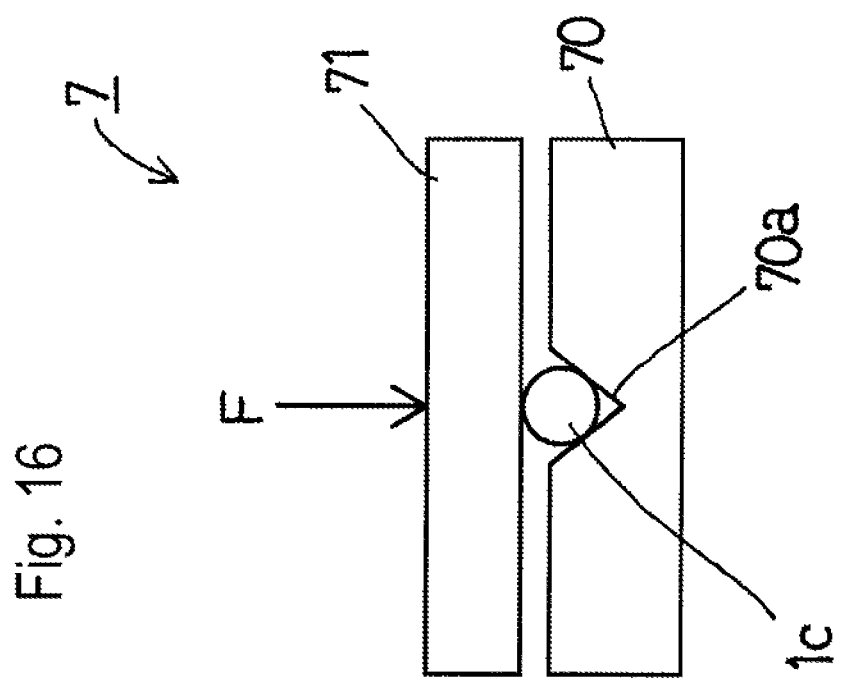
FIG. 16 illustrates a holder in a measuring apparatus of related art.
Figure 17:
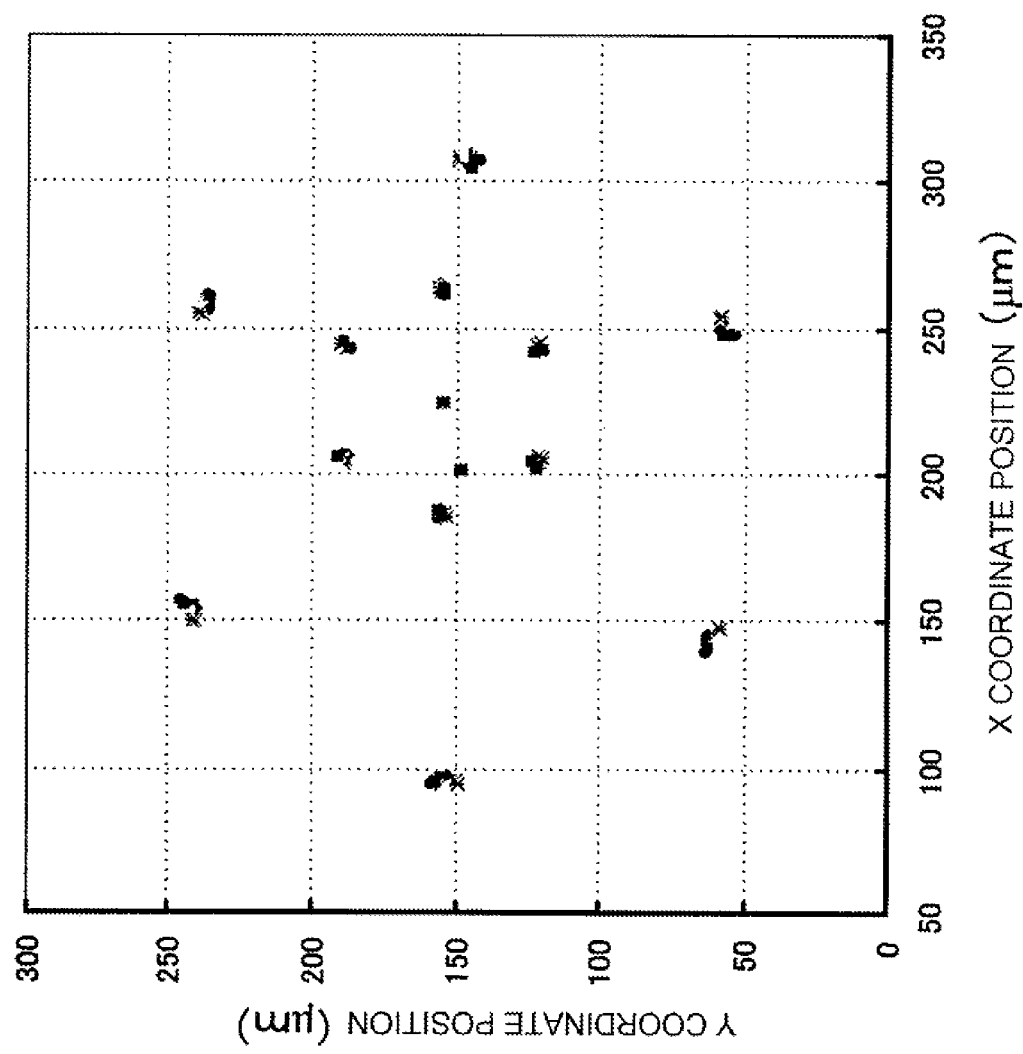
FIG. 17 illustrates results of measurements performed with a measuring method of related art.

FIG. 17 illustrates superimposed results of 11 repeated measurements performed, in the same manner as above, on a single optical fiber by using the holder of the related art illustrated in FIG. 16. Points at the center represent centers of locus circles, points at six inner positions represent results of measurements performed at $Z_1$, and points at six outer positions represent results of measurements performed at $Z_2$.

There is a substantial distance between the center of the inner locus circle and the center of the outer locus circle. Additionally, the degree of coincidence of the corresponding points in FIG. 17 is lower than that in FIG. 15.

In this related art, the repeatability of measurements of the exit angle was ±0.036° or less, and the standard deviation is $1.07 \times 10^{-2}$, which was about three times that in the present embodiment.

As described above, the repeatability of measurements of the exit angle in the present embodiment was about one-tenth that in the related art disclosed in PTL 1, and the standard deviation in the present embodiment was about one-third that in the related art illustrated in FIG. 16. Thus, the method and apparatus of the present embodiment have proven to be able to measure an exit angle of an optical fiber with accuracy much higher than that in the related art.

INDUSTRIAL APPLICABILITY

The exit angle measuring method and apparatus of the present invention can be used in measuring an exit angle of not only a single-mode optical fiber, but also a GRaded INdex lens (GRIN lens) fiber, which is a graded-index lens fiber.

Additionally, the exit angle measuring method and apparatus of the present invention can be used in measuring an exit angle of not only an optical fiber with an inclined end face, but also an optical fiber with a perpendicular end face or an optical fiber with a spherically-processed end face.

REFERENCE SIGNS LIST 1 optical fiber
1a inclined end face
1b sheathed portion
1c bare portion
2 holder
20 main body
20a end portion
20b bearing
20c groove
20d groove widened portion
20e transverse hole
21 lid
22 magnet
23 screw
24 end tubular portion
24a small-diameter portion
24b large-diameter portion
24c tapered portion
24d widened portion
24e stepped portion
24f insertion portion
24g stepped portion
25 coil spring
26 outer ring
26a female thread
26b reduced diameter portion
3 stand
30 base plate portion
31 vertical plate portion
32 hole
33 metal mount
4 rotating holder
40 chuck
5 stage
6 CCD camera
60 light receiving surface
7 holder
70 main body
70a groove
71 retaining plate

The invention claimed is:

1. A method for measuring an exit angle of an optical fiber, the method comprising:
   passing a measurement end of the optical fiber through a through hole of a holder;
   receiving output light from the measurement end at a light receiving member while rotating the optical fiber using the through hole as a guide;
   measuring coordinates of at least three points on a locus circle of the output light to calculate a size of the locus circle; and
   measuring the exit angle of light from the measurement end of the optical fiber on the basis of the size of the locus circle,
   wherein the through hole of the holder has a small-diameter portion on a front side and a large-diameter portion on a rear side, an inside diameter of the small-diameter portion is 0.1 µm to 1.0 µm larger than a diameter of a bare fiber, an inside diameter of the large-diameter portion is larger than a diameter of a sheathed fiber, and a portion between the small-diameter portion and the large-diameter portion is tapered; and
   the sheathed fiber with a sheath at a leading end thereof removed is inserted from a rear end of the large-diameter portion, and a bare portion obtained by removing the sheath at the leading end of the sheathed fiber is passed into the small-diameter portion to perform measurement.

2. The method according to claim 1, wherein the holder includes a fixing section that can selectively switch between a fixed state in which the optical fiber is fixed and a released state in which the fixed state is released.

3. The method according to claim 2, wherein a diameter $D_1$ of the locus circle is calculated at a position where a distance from the light receiving member to a center of a measurement end face of the optical fiber is $Z_1$, a diameter $D_2$ of the locus circle is calculated at a position where the distance is $Z_2$, and an exit angle θ of the optical fiber is determined by $$\theta = \tan^{-1}[\{D_2 - D_1\}/2\{Z_2 - Z_1\}].$$

4. The method according to claim 1, wherein a diameter $D_1$ of the locus circle is calculated at a position where a distance from the light receiving member to a center of a measurement end face of the optical fiber is $Z_1$, a diameter $D_2$ of the locus circle is calculated at a position where the distance is $Z_2$, and an exit angle θ of the optical fiber is determined by $$\theta=\tan^{-1}[\{D_2-D_1\}/2\{Z_2-Z_1\}].$$

5. An apparatus for measuring an exit angle of an optical fiber, the apparatus comprising:
- a holder having a through hole for passing a measurement end of an optical fiber therethrough;
- a rotating member configured to rotate the optical fiber placed in the holder;
- a laser source configured to cause laser light to be incident on an incident end of the optical fiber;
- a light receiving member configured to receive output light from the measurement end of the optical fiber;
- an image processing unit configured to output coordinates of the received light; and
- a processing unit configured to calculate a size of a locus circle of the output light on the basis of the coordinates output from the image processing unit,
- wherein the through hole of the holder has a small-diameter portion on a front side and a large-diameter portion on a rear side, an inside diameter of the small-diameter portion is 0.1 μm to 1.0 μm larger than a diameter of a bare fiber, an inside diameter of the large-diameter portion is larger than a diameter of a sheathed fiber, and a portion between the small-diameter portion and the large-diameter portion is tapered;
- the sheathed fiber with a sheath at a leading end thereof removed is inserted from a rear end of the large-diameter portion, and a bare portion obtained by removing the sheath at the leading end of the sheathed fiber is passed into the small-diameter portion; and
- the apparatus receives the output light from the measurement end of the optical fiber at the light receiving member while rotating the optical fiber using the through hole as a guide, and measures the exit angle of the optical fiber on the basis of the size of the locus circle calculated by measuring coordinates of at least three points on the locus circle of the output light.

6. The apparatus according to claim 5, wherein the holder includes a fixing section that can selectively switch between a fixed state in which the optical fiber is fixed and a released state in which the fixed state is released.

7. The apparatus according to claim 6, wherein the processing unit calculates a diameter $D_1$ of the locus circle at a position where a distance from the light receiving member to a center of a measurement end face of the optical fiber is $Z_1$, calculates a diameter $D_2$ of the locus circle at a position where the distance is $Z_2$, and determines an exit angle θ of the optical fiber by $$\theta=\tan^{-1}[\{D_2-D_1\}/2\{Z_2-Z_1\}].$$

8. The apparatus according to claim 5, wherein the processing unit calculates a diameter $D_1$ of the locus circle at a position where a distance from the light receiving member to a center of a measurement end face of the optical fiber is $Z_1$, calculates a diameter $D_2$ of the locus circle at a position where the distance is $Z_2$, and determines an exit angle θ of the optical fiber by $$\theta=\tan^{-1}[\{D_2-D_1\}/2\{Z_2-Z_1\}].$$

\* \* \* \* \*